US008277574B2

(12) United States Patent
Sakai et al.

(10) Patent No.: US 8,277,574 B2

(45) Date of Patent: Oct. 2, 2012

(54) METHOD FOR MANUFACTURING GRAIN-ORIENTED ELECTROMAGNETIC STEEL SHEET WHOSE MAGNETIC DOMAINS ARE CONTROLLED BY LASER BEAM IRRADIATION

(75) Inventors: Tatsuhiko Sakai, Tokyo (JP); Hideyuki Hamamura, Tokyo (JP); Masao Yabumoto, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 273 days.

(21) Appl. No.: 12/744,583

(22) PCT Filed: Dec. 11, 2008

(86) PCT No.: PCT/JP2008/072525
§ 371 (c)(1),
(2), (4) Date: May 25, 2010

(87) PCT Pub. No.: WO2009/075328
PCT Pub. Date: Jun. 18, 2009

(65) Prior Publication Data
US 2010/0243629 A1 Sep. 30, 2010

(30) Foreign Application Priority Data
Dec. 12, 2007 (JP) ................................ 2007-320615

(51) Int. Cl.
*H01F 1/147* (2006.01)
*B23K 26/00* (2006.01)

(52) U.S. Cl. ........ 148/113; 148/111; 148/112; 148/120; 148/308; 148/512; 219/121.6; 219/121.68; 219/121.85; 428/167; 428/593; 72/56; 72/68

(58) Field of Classification Search .................. 148/111, 148/112, 113, 120, 308, 512; 219/121.6, 219/121.68, 121.85; 428/167, 593; 72/56, 72/68
See application file for complete search history.

(56) References Cited

U.S. PATENT DOCUMENTS 4,655,854 A * 4/1987 Nishiike et al. ............... 148/111
(Continued)

FOREIGN PATENT DOCUMENTS

JP 56-51522 A 5/1981
(Continued)

OTHER PUBLICATIONS

PCT/IB/338 dated Aug. 19, 2010—PCT/JP2008/072525.
(Continued)

*Primary Examiner* — Dao H Nguyen
(74) *Attorney, Agent, or Firm* — Birch, Stewart, Kolasch & Birch, LLP

(57) ABSTRACT

There is provided a method for manufacturing a grain-oriented electromagnetic steel sheet whose iron losses are reduced by laser beam irradiation, capable of improving the iron losses in both the L-direction and the C-direction while easily ensuring high productivity. The method for manufacturing a grain-oriented electromagnetic steel sheet reduces iron losses by scanning and irradiating a grain-oriented electromagnetic steel sheet with a continuous-wave laser beam condensed into a circular or elliptical shape at constant intervals in a direction substantially perpendicular to a rolling direction of the grain-oriented electromagnetic steel sheet, wherein when an average irradiation energy density Ua is defined as $Ua=P/(Vc\times PL)$ ($mJ/mm^2$), where P (W) is average power of the laser beam, Vc (m/s) is a beam scanning velocity, and PL (mm) is an irradiation interval in a rolling direction, PL and Ua are in the following ranges: $1.0\ mm \leqq PL \leqq 3.0\ mm$, $0.8\ mJ/mm^2 \leqq Ua \leqq 2.0\ mJ/mm^2$.

10 Claims, 10 Drawing Sheets

U.S. PATENT DOCUMENTS

| | | | | | |
|---|---|---|---|---|---|
| 5,296,051 | A * | 3/1994 | Inokuti et al. | | 148/113 |
| 5,718,775 | A * | 2/1998 | Komatsubara et al. | | 148/308 |
| 5,853,499 | A * | 12/1998 | Komatsubara et al. | | 148/113 |
| 6,444,050 | B1 * | 9/2002 | Komatsubara et al. | | 148/111 |
| 7,442,260 | B2 | 10/2008 | Sakai et al. | | |
| 2006/0169362 | A1 | 8/2006 | Sakai et al. | | |

FOREIGN PATENT DOCUMENTS

| | | | |
|---|---|---|---|
| JP | 56-83012 | A | 7/1981 |
| JP | 56-105426 | A | 8/1981 |
| JP | 56-105454 | A | 8/1981 |
| JP | 59-229419 | A | 12/1984 |
| JP | 2003-34822 | A | 2/2003 |
| JP | 2005-336529 | A | 12/2005 |
| JP | 2006-233299 | A | 9/2006 |
| JP | 2007-119821 | A | 5/2007 |
| WO | 2004/083465 | A1 | 9/2004 |

OTHER PUBLICATIONS

International Search report dated Mar. 17, 2009 issued in corresponding PCT/JP2008/072525.

* cited by examiner

METHOD FOR MANUFACTURING GRAIN-ORIENTED ELECTROMAGNETIC STEEL SHEET WHOSE MAGNETIC DOMAINS ARE CONTROLLED BY LASER BEAM IRRADIATION

TECHNICAL FIELD

The present invention relates to a method for manufacturing a grain-oriented electromagnetic steel sheet whose magnetic domains are controlled by laser beam irradiation and which is suited to a transformer.

BACKGROUND ART

A grain-oriented electromagnetic steel sheet contains easy magnetization axes oriented in a rolling direction (hereinafter also referred to L-direction) in a manufacturing process and has remarkably low iron losses in the L-direction. In manufacturing the grain-oriented electromagnetic steel sheet, when the steel sheet is irradiated with a laser beam in the direction substantially perpendicular to the L-direction, the iron losses in the L-direction are further reduced. The grain-oriented electromagnetic steel sheet is used mainly as a material for an iron core of a large-sized transformer which has severe requirements for iron losses.

FIG. 8 is a schematic diagram illustrating a conventional method for irradiating a surface of a grain-oriented electromagnetic steel sheet with a laser beam. FIG. 5A is a schematic diagram illustrating a method for manufacturing an iron core of an ordinary transformer and FIG. 5B is a schematic diagram illustrating the iron core.

As illustrated in FIG. 8, in manufacturing a grain-oriented electromagnetic steel sheet whose magnetic domains are controlled by laser beam irradiation, the grain-oriented electromagnetic steel sheet 12 is irradiated with a laser beam while laser beam scanning is being performed at a velocity of Vc in substantially parallel to the plate width direction (hereinafter referred to as C-direction). The C-direction is orthogonal to the L-direction. Besides, the grain-oriented electromagnetic steel sheet 12 is conveyed at a velocity of VL in the L-direction. Thus, a plurality of laser beam irradiation portions 17 extending in substantially parallel to the C-direction aligns at constant intervals of PL. In manufacturing an iron core 4 of a transformer, as illustrated in FIGS. 5A and 5B, the grain-oriented electromagnetic steel sheet is sheared so that a magnetization direction M of an iron core element 3 constituting the iron core 4 and the L-direction meet each other, and the iron core elements 3 obtained by the shearing are layered.

In the iron core 4 manufactured in this way, the L-direction and the magnetization direction M meet each other at most portions thereof. Accordingly, the iron losses of the iron core 4 are in approximate proportion to the L-direction iron losses of the grain-oriented electromagnetic steel sheet of a raw material.

On the other hand, at joint portions 5 between the iron core elements 3 of the iron core 4, the L-direction and the magnetization direction M shift from each other. Accordingly, the iron losses of the joint portions 5 are different from the L-direction iron losses of the grain-oriented electromagnetic steel sheet of a raw material and are affected by iron losses in the C-direction. Thus, a region 6 having high iron losses exists. Particularly, in the iron core using the grain-oriented electromagnetic steel sheet whose L-direction iron losses are significantly reduced by laser beam irradiation, an effect of the C-direction iron losses becomes relatively larger.

Transformers are used at a large number of positions of power transmission equipment from a power plant to power consumption locations. Accordingly, when iron loss per transformer changes by even about 1%, power transmission loss significantly changes at the whole power transmission equipment. Consequently, there is strongly demanded a method for manufacturing a grain-oriented electromagnetic steel sheet capable of reducing C-direction iron losses while L-direction iron losses are being restrained to be low by laser beam irradiation.

However, a mechanism for improving C-direction iron losses has not been clarified nor a method for reducing iron losses in the two directions of L-direction and C-direction has been established until now.

In a conventional method for improving iron losses of a magnetic steel sheet, a principal objective is to reduce L-direction iron losses. For example, Patent Document 5 discloses a method for manufacturing a grain-oriented electromagnetic steel sheet which is irradiated with a laser beam by defining a mode of a laser beam, a light condensing diameter, power, a laser beam scanning velocity, an irradiation pitch and the like. However, there is no description of C-direction iron losses.

In addition, a method in which attention is focused to improvement of the iron losses in the C-direction has also been proposed.

Patent Document 1 discloses a method for irradiating a laser beam in parallel to an L-direction. However, this method reduces iron losses in the C-direction, but does not reduce iron losses in the L-direction. Since an effect of the L-direction iron losses is large as described above, iron loss of a transformer becomes larger than that of the grain-oriented electromagnetic steel sheet with improved iron losses in the L-direction by irradiating a laser beam perpendicular to the L-direction.

Patent Document 2 discloses a method for irradiating a laser beam in parallel to two directions of L-direction and C-direction. However, this method, irradiating a laser beam twice, complicates a manufacturing process and lowers production efficiency by at least one-half.

Patent Documents 3 and 4 disclose a method for irradiating a laser beam while an irradiation direction and an irradiation condition are being changed for each cut element after a grain-oriented electromagnetic steel sheet not subjected to laser beam irradiation is sheared into a desired shape, in manufacturing an iron core. However, in an iron core manufactured according to this method, a portion in which only the iron losses in the L-direction are improved and a portion in which only the iron losses in the C-direction are improved are mixed, therefore it cannot be said that significantly good iron losses are obtained. Besides, to improve iron losses in two directions of the L-direction and C-direction, it is necessary to change conditions and irradiate a laser beam twice. Further, there is a problem of very low productivity because the grain-oriented electromagnetic steel sheet is irradiated with a laser beam for each element after the grain-oriented electromagnetic steel sheet is sheared.

Patent Document 1: Japanese Laid-open Patent Publication No. 56-51522

Patent Document 2: Japanese Laid-open Patent Publication No. 56-105454

Patent Document 3: Japanese Laid-Open Patent Publication No. 56-83012

Patent Document 4: Japanese Laid-Open Patent Publication No. 56-105426

Patent Document 5: International Publication Pamphlet No. WO 04/083465

SUMMARY OF THE INVENTION

It is an object of the present invention to provide a method for manufacturing a grain-oriented electromagnetic steel sheet whose magnetic domains are controlled by laser beam irradiation, capable of reducing iron losses in both directions of the L-direction and the C-direction while easily ensuring high productivity.

According to the present invention, there is provided a method for manufacturing a grain-oriented electromagnetic steel sheet whose magnetic domains are controlled by laser beam irradiation, including the step of: repeatedly irradiating a surface of a grain-oriented electromagnetic steel sheet with a condensed continuous-wave laser beam by scanning the grain-oriented electromagnetic steel sheet from a rolling direction toward an inclination direction thereof while scanning portions of the continuous-wave laser beam are being shifted at intervals, wherein when an average irradiation energy density Ua is defined as Ua=P/Vc/PL (mJ/mm$^2$), where P (W) is average power of the continuous-wave laser beam, Vc (mm/s) is a velocity of the scanning, and PL (mm) is each of the intervals, the following relationships are satisfied:

$$1.0\text{ mm} \leqq PL \leqq 3.0\text{ mm}$$

$$0.8\text{ mJ/mm}^2 \leqq Ua \leqq 2.0\text{ mJ/mm}^2.$$

It is preferable to satisfy the following relationships when an irradiation power density Ip of the continuous-wave laser beam is defined as Ip=(4/π)×P/(dL×dc) (kW/mm$^2$), where dc (mm) is a diameter of the continuous-wave laser beam in the scanning direction, and dL (mm) is a diameter of the continuous-wave laser beam in a direction orthogonal to the scanning direction:

$$(88-15\times PL)\text{ kW/mm}^2 \geqq Ip \geqq (6.5-1.5\times PL)\text{ kW/mm}^2$$

$$1.0\text{ mm} \leqq PL \leqq 4.0\text{ mm}.$$

DETAILED DESCRIPTION OF THE PREFERRED EMBODIMENTS

Figure 7A:
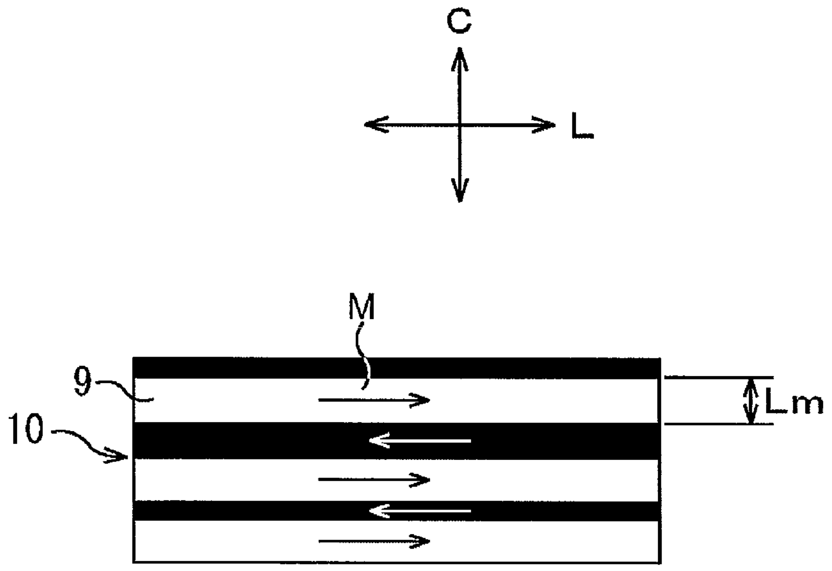
FIG. 7A is a schematic diagram illustrating a magnetic domain structure of a grain-oriented electromagnetic steel sheet before laser beam irradiation.
Figure 7B:
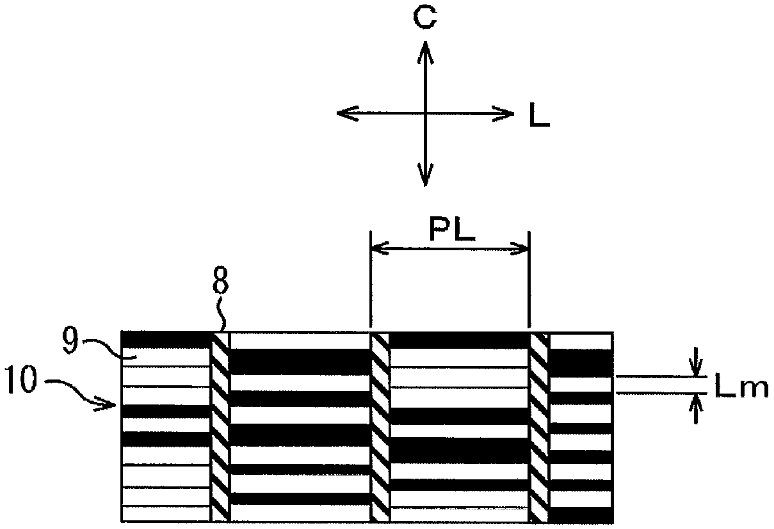
FIG. 7B is a schematic diagram illustrating a magnetic domain structure of the grain-oriented electromagnetic steel sheet after laser beam irradiation.
Figure 8:
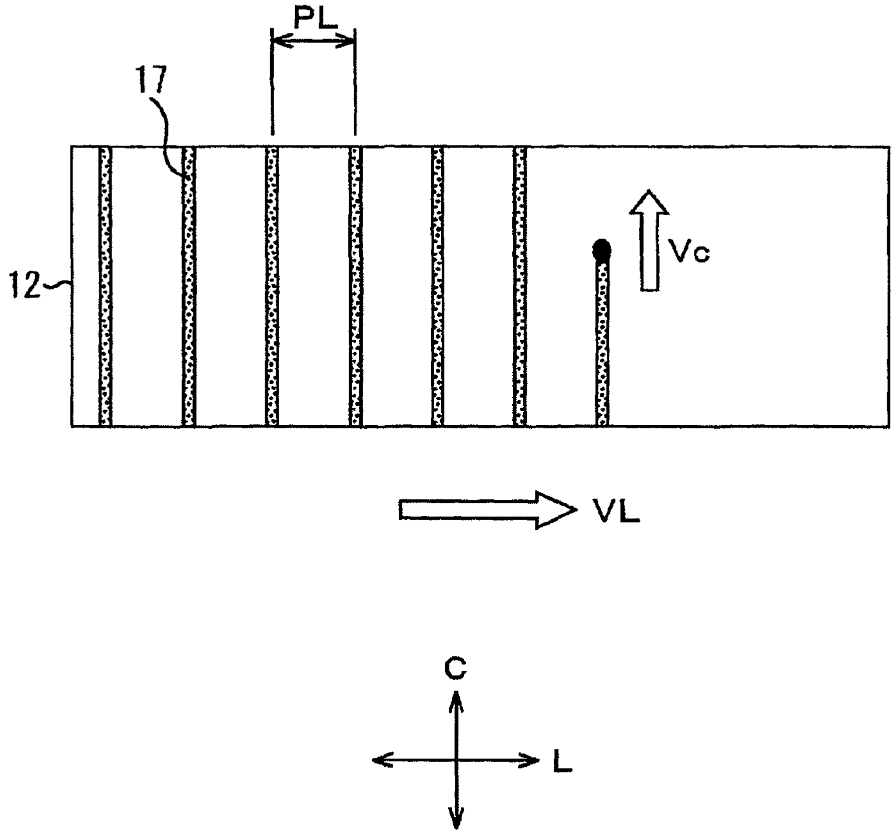
FIG. 8 PRIOR ART
FIG. 8 is a schematic diagram illustrating a conventional method for irradiating a surface of a grain-oriented electromagnetic steel sheet with a laser beam.

First, a principle in which iron losses of a grain-oriented electromagnetic steel sheet are improved by laser beam irradiation will be described with reference to FIGS. 7A and 7B. FIG. 7A is a schematic diagram illustrating a magnetic domain structure of a grain-oriented electromagnetic steel sheet before laser beam irradiation. FIG. 7B is a schematic diagram illustrating a magnetic domain structure of the grain-oriented electromagnetic steel sheet after laser beam irradiation. In a grain-oriented electromagnetic steel sheet, a magnetic domain 9 referred to as a 180° magnetic domain is formed in parallel to an L-direction. The magnetic domain 9 is schematically illustrated as a black colored portion and a white colored portion in FIGS. 7A and 7B. At the black colored portion and the white colored portion, magnetization directions thereof are reversed each other.

A boundary portion between the magnetic domains whose magnetization directions are reversed is referred to as a magnetic wall. That is to say, in FIGS. 7A and 7B, a magnetic wall 10 exists at the boundary portion between the black colored portion and the white colored portion. The 180° magnetic domain is easy to magnetize with an L-direction magnetic field, and difficult to magnetize with a C-direction magnetic field. Thus, the L-direction iron losses WL of the 180° magnetic domains are smaller than the C-direction iron losses WC. Besides, the L-direction iron losses WL are classified into classical eddy current losses, abnormal eddy current losses, and hysteresis losses. It is known that the abnormal eddy current losses, above of all, decrease more as the interval Lm of a magnetic wall between the 180° magnetic domains (180° magnetic wall) is smaller.

When the grain-oriented electromagnetic steel sheet is irradiated with a laser beam, local distortion occurs in a grain-oriented electromagnetic steel sheet due to an influence of local rapid heating and cooling by a laser beam and a reaction generated when a coating on a surface of the grain-oriented electromagnetic steel sheet evaporates. In addition, closure domains 8 occur directly underneath the distortion. In the closure domains 8, a great many fine magnetic domains exist and static magnetic energy is in a high state.

Accordingly, to release the total energy of the grain-oriented electromagnetic steel sheet, the 180° magnetic domains increase in number and an interval Lm thereof becomes narrow, as illustrated in FIG. 7B. Thus, the abnormal eddy current losses decrease in number. Such an operation allows L-direction iron losses WL to decrease in number by laser beam irradiation.

The hysteresis losses increase with an increase in the distortion of grain-oriented electromagnetic steel sheet. When laser beam irradiation is performed excessively, more hysteresis losses occur than a decrease in the abnormal eddy current loss, thus a total L-direction iron losses WL increase in number. Besides, when laser beam irradiation is performed excessively, excessive distortion occurs, a magnetostrictive characteristic of a grain-oriented electromagnetic steel sheet decreases, thus noise generation from the transformer increases.

Further, the classical eddy current losses are iron losses which are in proportion to the thickness of a steel sheet and which make no changes before and after laser beam irradiation.

On the other hand, the closure domains 8 generated by laser beam irradiation are magnetic domains easy to magnetize in the C-direction. Thus, it is estimated that the C-direction iron losses WC decrease with generation of the closure domains 8.

Next, a manufacturing method according to an embodiment of the present invention will be described.

Figure 6:
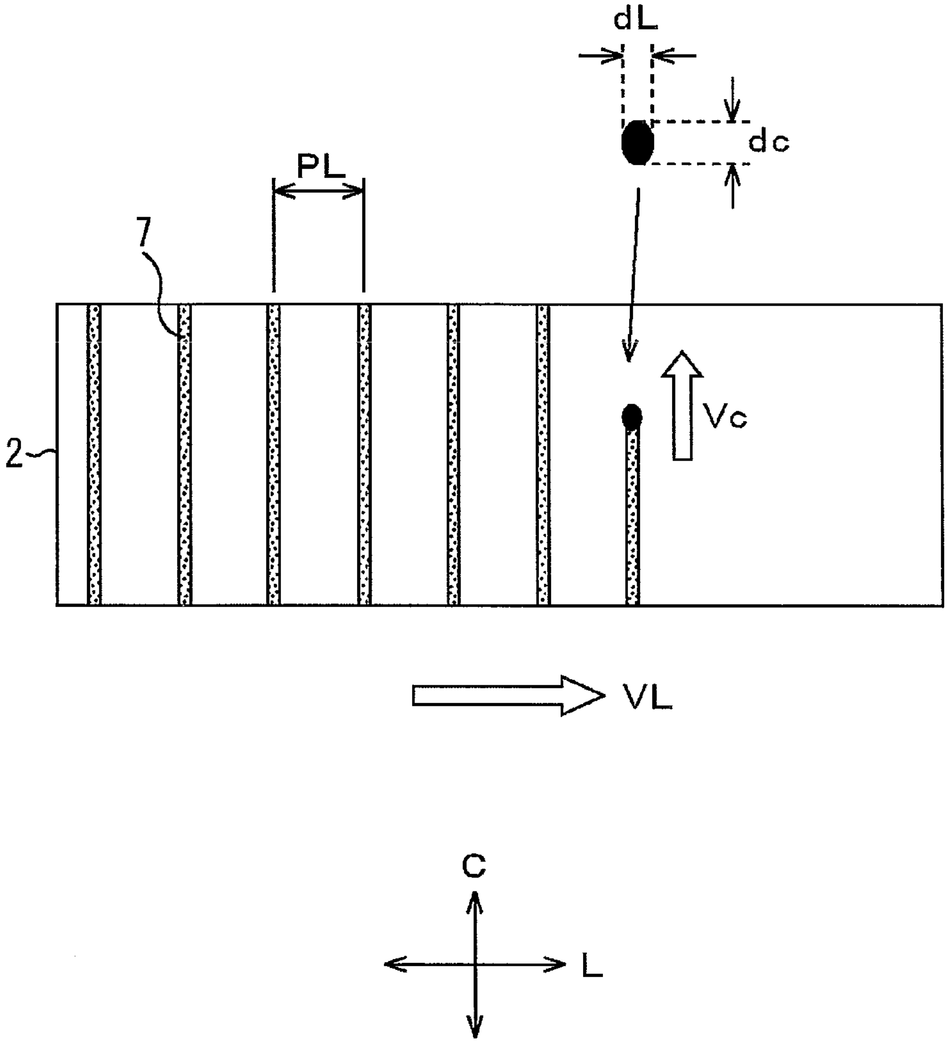
FIG. 6 is a schematic diagram illustrating a method for irradiating a surface of a grain-oriented electromagnetic steel sheet with a laser beam according to an embodiment of the present invention.

FIG. 6 is a schematic diagram illustrating a method for irradiating a surface of a grain-oriented electromagnetic steel sheet with a laser beam according to an embodiment of the present invention. A grain-oriented electromagnetic steel sheet 2 not irradiated with a laser beam, serving as a grain-oriented electromagnetic steel sheet, is subjected to finishing anneal, flattening anneal and a surface insulation coating. Thus, on a surface of the grain-oriented electromagnetic steel sheet 2, for example, a glass coating and an insulation coating formed by the anneal exist.

A continuous-wave laser beam emitted from a laser is reflected on a scanning mirror (not illustrated) and, after light condensation is performed by a fθ light condensing lens (not illustrated), is applied to the steel plate 2 while laser beam scanning is being performed on the steel plate 2 at a velocity of Vc in substantially parallel to the C-direction (direction perpendicular to the L-direction). As a result, closure domains occur directly underneath a laser beam irradiation portion 7 with distortion caused by a laser beam as a starting point thereof.

The steel sheet 2 is conveyed at a constant velocity of VL in the L-direction on a continuous manufacturing line. Accordingly, an interval PL of laser beam irradiation is constant and is adjusted by the velocity VL and a C-direction scanning frequency, for example. A shape of a light condensing beam on a surface of the steel sheet 2 is circular or elliptical. The C-direction scanning frequency refers to a scanning frequency of lasers in the C-direction per second.

The inventors of the present invention investigated a distortion providing effect by laser beam irradiation. That is to say, the inventors investigated a relationship between average irradiation energy densities Ua on the whole steel sheet, and L-direction iron losses WL and C-direction iron losses WC. The average energy density, taken as Ua, is defined in the following equation (1): where, P is laser beam power, Vc is a scanning velocity and PL is an interval.

$$Ua = P/(Vc \times PL)\ (\mathrm{mJ/mm^2}) \quad (1)$$

Figure 4:
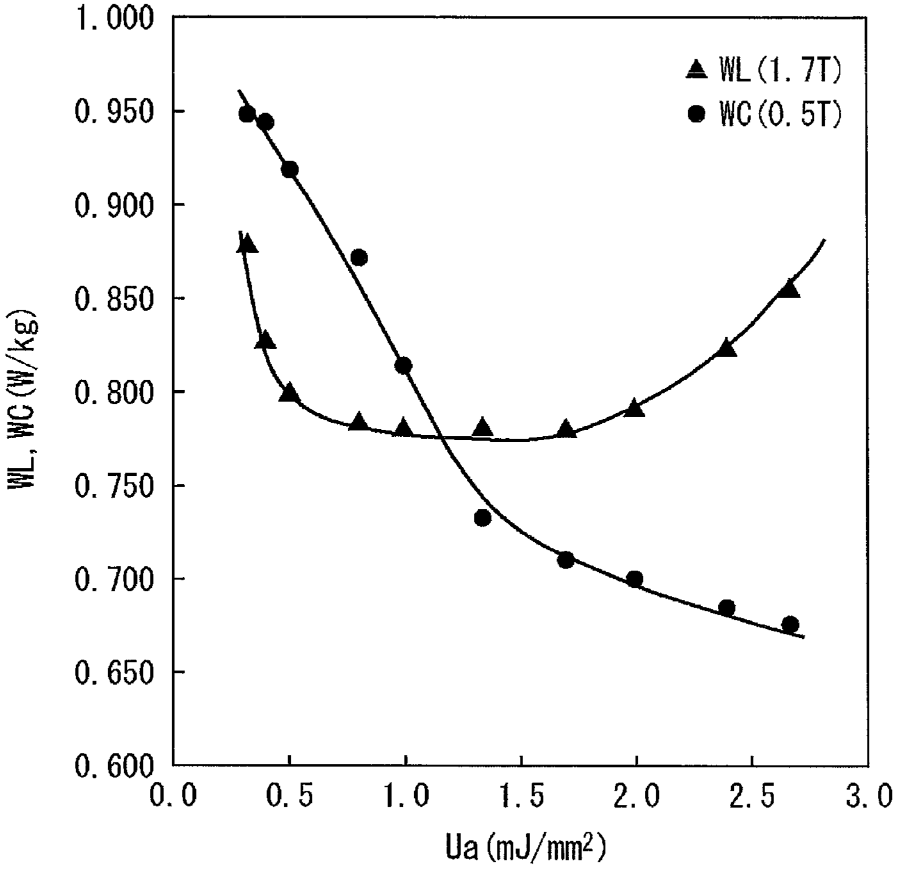
FIG. 4 is a graph illustrating a relationship between average energy densities Ua, and L-direction iron losses WL and C-direction iron losses WC.
Figure 5A:
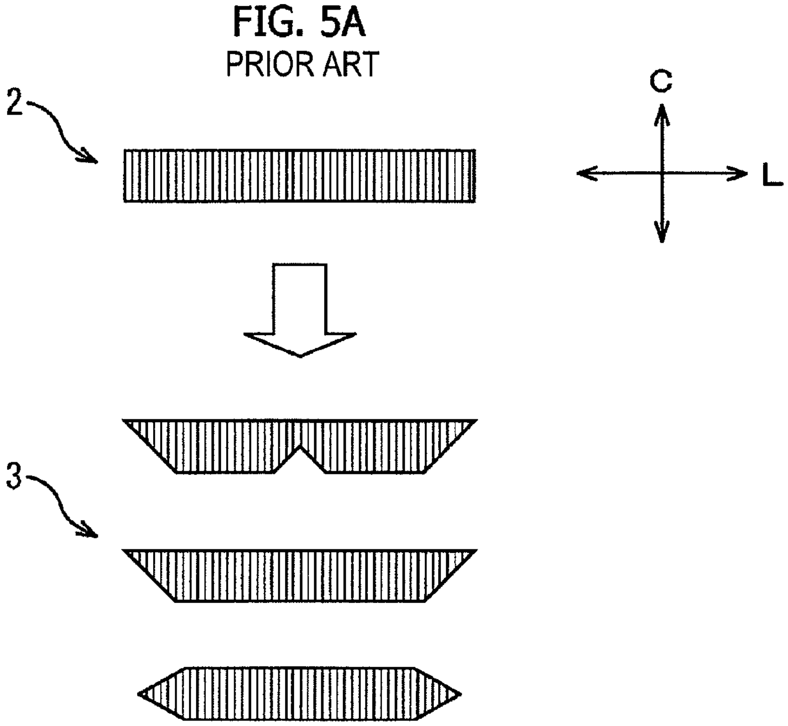
FIG. 5A PRIOR ART
FIG. 5A is a schematic diagram illustrating an ordinary method for manufacturing an iron core of a transformer.
Figure 5B:
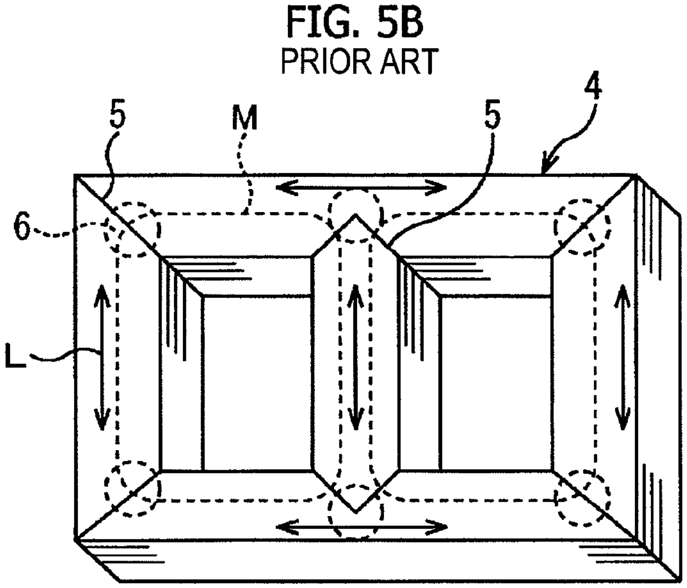
FIG. 5B PRIOR ART
FIG. 5B is a schematic diagram illustrating an iron core.

FIG. 4 is a graph illustrating a relationship between average energy densities Ua, and L-direction iron losses WL and C-direction iron losses WC. The interval PL was 4 mm, the diameter dL of the light condensing beam in the L-direction was 0.1 mm, the diameter dc of the light condensing beam in the C-direction was 0.2 mm, the scanning velocity Vc was 32 m/s and the conveyance velocity VL was 1 m/s. In addition, the average energy density Ua was changed by adjusting power P. The L-direction iron losses WL illustrated on a vertical axis of FIG. 4 are iron loss values when an alternating field of 50 Hz was applied at a maximum magnetic flux density of 1.7 T in the L-direction, and the C-direction iron losses WC are iron loss values when an alternating field of 50 Hz was applied at a maximum magnetic flux density of 0.5 T in the C-direction.

Here, the reason that a magnetic flux density is lowered in evaluating the C-direction iron loss is that a C-direction component of magnetic field strength at the joint of the iron core of the transformer was estimated as approximately ⅓ as large as L-direction component.

The result illustrated in FIG. 4 indicates that the average energy density Ua has a range in which the L-direction iron loss WL can be made into a minimum value or an approximate value thereto and the C-direction iron loss WC almost monotonously decreases with an increase in the average energy density Ua. Moreover, from the result illustrated in FIG. 4, to lower both of the L-direction iron loss WL and the C-direction iron loss WC, preferably, the average energy density Ua is $0.8\ \mathrm{mJ/mm^2} \leqq Ua \leqq 2.0\ \mathrm{mJ/mm^2}$ and more preferably, $1.1\ \mathrm{mJ/mm^2} \leqq Ua \leqq 1.7\ \mathrm{mJ/mm^2}$.

It is conceivable that one of reasons that the result as illustrated in FIG. 4 was obtained is that when the average energy density Ua was low, the number of closure domains was low and the interval between 180° magnetic walls was difficult to reduce, thus making it difficult to reduce the abnormal eddy current loss. It is conceivable that another reason is that when the average energy density Ua was high, the abnormal eddy current losses decreased; however, the hysteresis losses increased upon excessive charging of laser beam energy.

It is conceivable that when the average energy density Ua is high, the iron losses of the iron core are improved to some degree while the L-direction iron losses WL are being sacrificed to some degree because the C-direction iron losses WC monotonously decrease. However, electromagnetic characteristic degrades, so that noise generation from the transformer increases. Further, it becomes necessary to increase laser beam power and quantity of lasers required for manufacture.

In the present invention, the average energy density Ua is limited to a range Ra of $0.8\ \mathrm{mJ/mm^2} \leqq Ua \leqq 2.0\ \mathrm{mJ/mm^2}$ and the C-direction iron losses WC are reduced while the L-direction iron losses WL are maintained at an approximate value to the minimum value.

The inventors of the present invention made a hypothesis that the C-direction iron loss WC may further decrease by generating closure domains as closely as possible over the whole surface of the steel sheet because the C-direction iron losses WC decrease due to generation of closure domains. That is to say, the inventors thought that the C-direction iron losses WC decrease by reducing the irradiation pitch (interval between laser beam irradiation portions) PL. However, when the irradiation pitch PL is simply decreased, the average energy density Ua increases from the equation (1), and the L-direction iron losses WL increase. Accordingly, the inventors studied that with the average energy density Ua fixed within the range Ra, the irradiation pitch PL is decreased and the scanning velocity Vc is increased.

Figure 1:
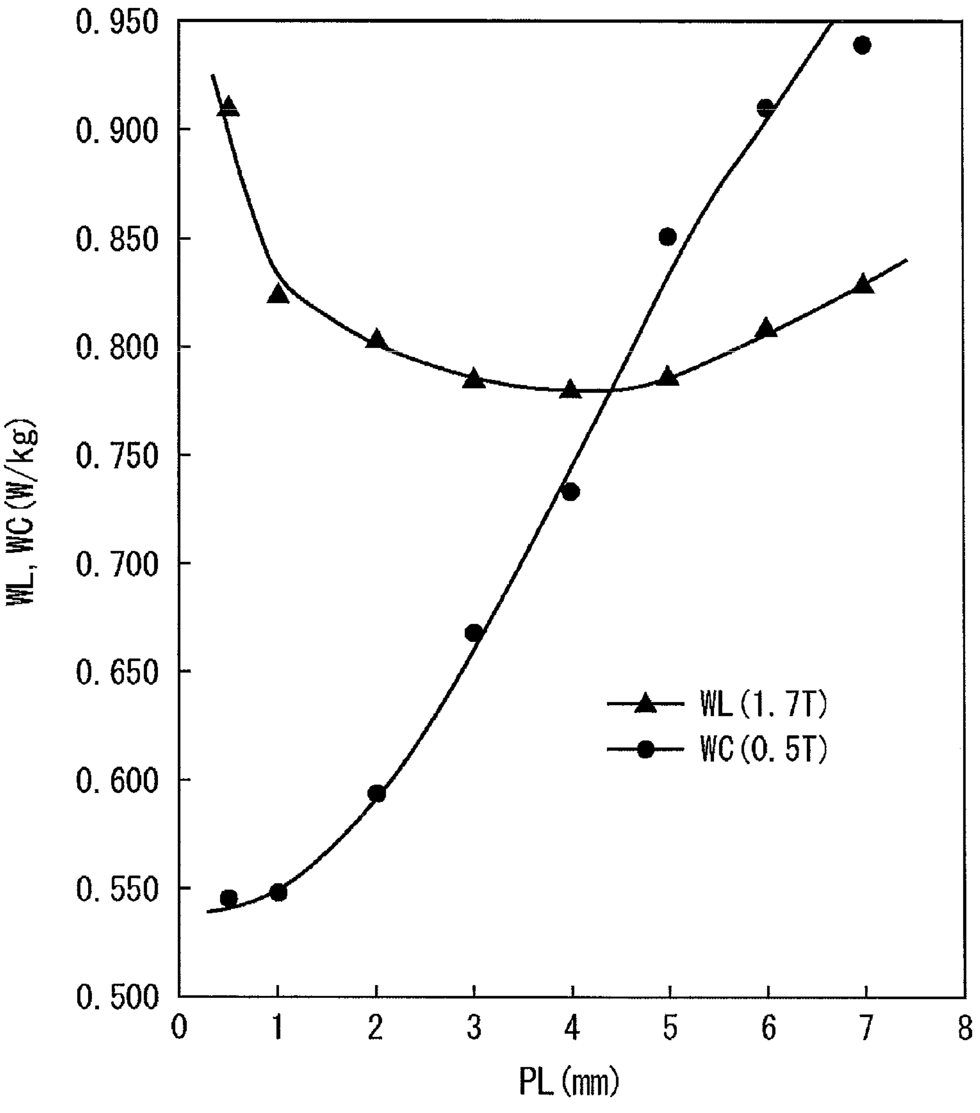
FIG. 1 is a graph illustrating a relationship between irradiation pitches PL, and L-direction iron losses WL and C-direction iron losses WC.

FIG. 1 is a graph illustrating a relationship between irradiation pitches PL, and L-direction iron losses WL and C-direction iron losses WC. With the average energy density Ua taken as $1.3\ \mathrm{mJ/mm^2}$, the power P was taken as 200 W, the diameter dL was taken as 0.1 mm and the diameter dc was taken as 0.2 mm. Further, the irradiation pitch PL was changed in inverse proportion by adjusting a scanning velocity Vc.

The result illustrated in FIG. 1 indicates that the C-direction iron losses WC significantly decrease by reducing the irradiation pitch PL even if the average energy density Ua is fixed. Besides, the L-direction iron losses WL slightly increase with a decrease in the irradiation pitch PL, while the L-direction iron losses WL are low when the irradiation pitch PL is 1.0 mm or more. However, when the irradiation pitch PL is in excess of 3.0 mm, the C-direction iron losses WC become excessively larger; therefore, a limit of the irradiation pitch PL is taken as 3.0 mm. From the viewpoint of improvement in a C-direction magnetic characteristic, preferably, the irradiation pitch PL is less than 2.0 mm and more preferably, less than 1.5 mm.

Thus, when the irradiation pitch PL is limited to 1.0 mm≦PL≦3.0 mm while the average energy density Ua is being accommodated within the range Ra, effects of reducing the L-direction iron losses WL and the C-direction iron losses WC are concurrently satisfied at a high level. As the average energy density Ua is accommodated within the range Ra, charging energy into the whole steel sheet becomes difficult to change, therefore, degradation of the electromagnetic characteristic by charging of excessive energy can be suppressed from being degraded.

In addition, the inventors studied a method for further improving the L-direction iron losses WL within a range Rb of the irradiation pitch PL (1.0 mm≦PL≦3.0 mm). It is conceivable that one of reasons that the C-direction iron losses WC decrease is a uniform distribution of closure domains, as described above. To reduce the L-direction iron losses WL, preferably, the interval between 180° magnetic walls is reduced. The inventors thought that distortion resistance per unit radiation of laser beam is important. It is conceivable that in an experiment whose result is illustrated in FIG. 1, the scanning velocity Vc was increased in inverse proportion to a decrease in the irradiation pitch PL; therefore, effects of rapid heating and rapid cooling per unit radiation degraded and thus distortion resistance degraded.

Accordingly, there was created a method for increasing the light condensing power density in addition to an increase in the scanning velocity Vc. The light condensing power density, taken as Ip, was defined in an equation (2). That is to say, the light condensing power density Ip is a value obtained by dividing the power P by a beam cross sectional area.

$$Ip=(4/\pi)\times P/(dL\times dc)\ (\mathrm{W/mm^2}) \tag{2}$$

Figure 3:
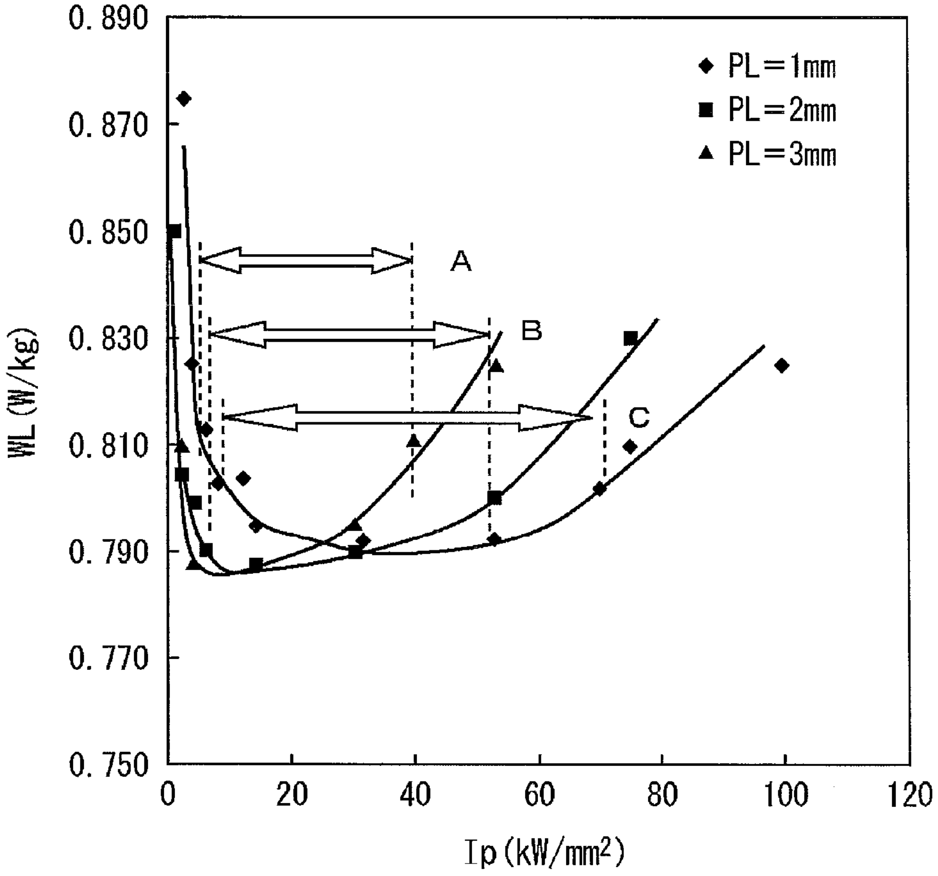
FIG. 3 is a graph illustrating a relationship between light condensing power densities Ip and L-direction iron losses WL.

FIG. 3 is a graph illustrating a relationship between light condensing power densities Ip and L-direction iron losses WL. The power P was fixed at 200 W and the average energy density Ua was fixed at 1.3 mJ/mm$^2$. The irradiation pitches PL were 1 mm, 2 mm and 3 mm within the range Rb. Further, by adjusting the diameters dL and dc at the respective irradiation pitches PL, the light condensing power density Ip was changed.

Figure 2:
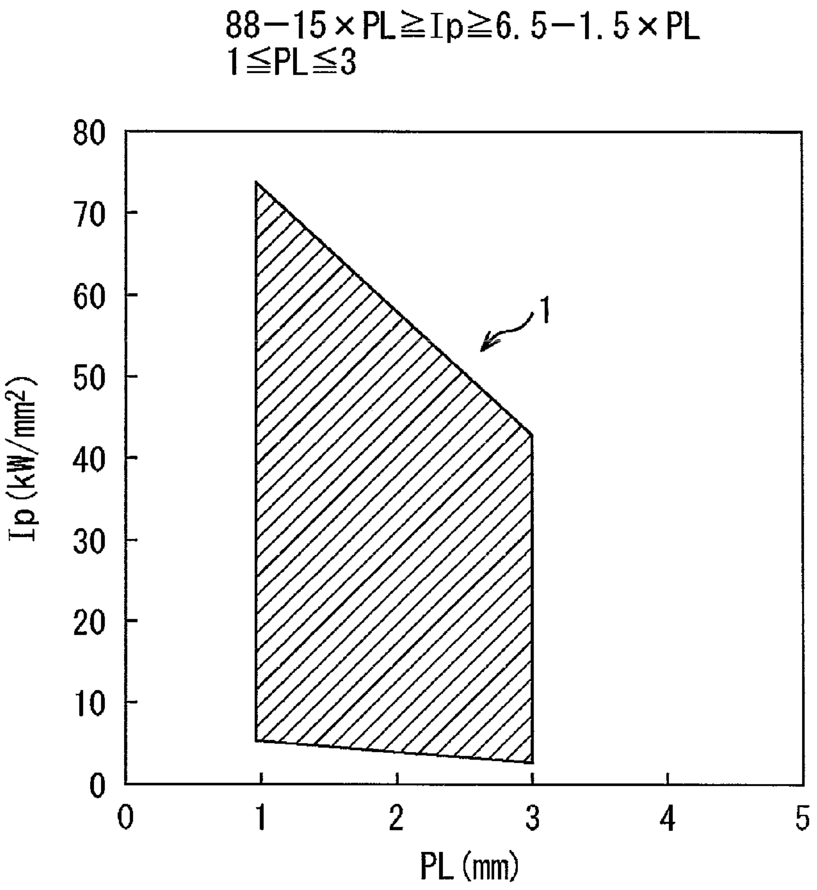
FIG. 2 is a diagram illustrating a preferable range of irradiation pitches PL and light condensing power densities Ip.

The result illustrated in FIG. 3 indicates that there is a range of a desirable light condensing power density Ip depending upon the irradiation pitch PL. As illustrated in FIG. 3, ranges A to C are desirable ranges of the light condensing power density Ip at the respective irradiation pitches PL. These ranges are defined by equations (3) and (4). These ranges can be illustrated as seen in FIG. 2.

$$88-15\times PL\geqq Ip\geqq 6.5-1.5\times PL\ (\mathrm{kW/mm^2}) \tag{3}$$

$$1.0\leqq PL\leqq 4.0\ (\mathrm{mm}) \tag{4}$$

To attain such a light condensing power density Ip, preferably, the light condensing beam diameter dL is set at 0.1 mm or less. To set the light condensing beam diameter dL at 0.1 mm or less, it is preferable to use a fiber laser.

As described above, according to the present invention, the average energy density Ua, the irradiation pitch PL and the light condensing power density Ip are defined based on a new discovery of a reduction mechanism of the L-direction iron losses WL and the C-direction iron losses WC by laser beam irradiation, therefore, L-direction iron losses WL and the C-direction iron losses WC can be reduced at a high level. Accordingly, the iron core of the transformer manufactured using the grain-oriented electromagnetic steel sheet whose magnetic domains are controlled by laser beam irradiation, and which is manufactured according to such a method provides lower iron losses in comparison with a conventional one. The laser beam irradiation in the present invention can be used in a continuous manufacturing line for a conventional grain-oriented electromagnetic steel sheet, therefore there is a merit of high productivity.

EXAMPLE

Next, an example belonging to the scope of the present invention will be described in comparison with a comparative example out of the scope of the present invention.

First, a unidirectionally grain-oriented electromagnetic steel sheet was prepared which contains Si: 3.1%, remainders made of Fe and a trace quantity of impurities, and has a thickness of 0.23 mm. Subsequently, a surface of a unidirectionally grain-oriented electromagnetic steel sheet was irradiated with a laser beam under conditions illustrated in Table 1.

TABLE 1

| | No. | P (W) | Vc (m/s) | PL (mm) | dL (mm) | dc (mm) | Ua (mJ/mm$^2$) | Ip (kW/mm$^2$) |
|---|---|---|---|---|---|---|---|---|
| Example | 1 | 200 | 50 | 3 | 0.1 | 0.2 | 1.3 | 12.7 |
| Example | 2 | 200 | 150 | 1 | 0.1 | 0.2 | 1.3 | 12.7 |
| Example | 3 | 200 | 150 | 1 | 0.05 | 0.09 | 1.3 | 56.6 |
| Comparative example | 4 | 200 | 30 | 5 | 0.1 | 0.2 | 1.3 | 12.7 |
| Comparative example | 5 | 200 | 30 | 3 | 0.1 | 0.2 | 2.2 | 12.7 |
| Comparative example | 6 | 200 | 100 | 3 | 0.1 | 0.2 | 0.7 | 12.7 |
| Comparative example | 7 | 200 | 50 | 3 | 0.05 | 0.09 | 1.3 | 56.6 |
| Comparative example | 8 | 200 | 50 | 3 | 0.2 | 1 | 1.3 | 1.3 |

Then, measurement of the respective unidirectionally grain-oriented electromagnetic steel sheets obtained after laser beam irradiation was made on the L-direction iron losses WL and the C-direction iron losses WC. Table 2 illustrates the result thereof.

TABLE 2

| | No. | WL (W/kg) | Wc (W/kg) |
|---|---|---|---|
| Example | 1 | 0.79 | 0.67 |
| Example | 2 | 0.82 | 0.55 |
| Example | 3 | 0.79 | 0.55 |
| Comparative example | 4 | 0.79 | 0.85 |
| Comparative example | 5 | 0.86 | 0.67 |
| Comparative example | 6 | 0.84 | 0.86 |
| Comparative example | 7 | 0.85 | 0.67 |
| Comparative example | 8 | 0.89 | 0.86 |

As illustrated in Table 2, in Examples No. 1, No. 2, and No. 3, which belong to the scope of the present invention, good C-direction iron losses WC were obtained almost without degradation of L-direction iron losses WL in comparison with Comparative Examples No. 4, No. 5, No. 6, No. 7, and No. 8, which are out of the scope of the present invention.

Industrial Applicability

The present invention provides a grain-oriented electromagnetic steel sheet whose iron losses in both directions of the rolling direction and the plate width direction orthogonal to the rolling direction are suitably reduced and whose magnetic domains are controlled by laser beam irradiation. Thus, iron losses of a transformer manufactured using such a grain-oriented electromagnetic steel sheet can be reduced in comparison with a conventional one. Further, the present invention, enabling implementation on a continuous manufacturing line, provides high productivity as well.

What is claimed is:

1. A method for manufacturing a grain-oriented electromagnetic steel sheet whose magnetic domains are controlled by laser beam irradiation, comprising the step of:

repeatedly irradiating a surface of a grain-oriented electromagnetic steel sheet with a condensed continuous-wave laser beam by scanning the grain-oriented electromagnetic steel sheet from a rolling direction toward an inclination direction thereof while scanning portions of the continuous-wave laser beam are being shifted at intervals, wherein when an average irradiation energy density Ua is defined as Ua=P/Vc/PL (mJ/mm$^2$), where P (W) is average power of the continuous-wave laser beam, Vc (mm/s) is a velocity of the scanning, and PL (mm) is each of the intervals, the following relationships are satisfied:

$$1.0\text{ mm} \leqq PL \leqq 3.0\text{ mm}$$

$$0.8\text{ mJ/mm}^2 \leqq Ua \leqq 2.0\text{ mJ/mm}^2.$$

2. The method for manufacturing a grain-oriented electromagnetic steel sheet whose magnetic domains are controlled by laser beam irradiation according to claim 1, wherein when an irradiation power density Ip of the continuous-wave laser beam is defined as Ip=(4/π)×P/(dL×dc) (kW/mm$^2$), where dc (mm) is a diameter of the continuous-wave laser beam in a direction of the scanning, and dL (mm) is a diameter of the continuous-wave laser beam in a direction orthogonal to the direction of the scanning, the following relationships are satisfied:

$$(88-15\times PL)\text{ kW/mm}^2 \geqq Ip \geqq (6.5-1.5\times PL)\text{ kW/mm}^2$$

$$1.0\text{ mm} \leqq PL \leqq 4.0\text{ mm}.$$

3. The method for manufacturing a grain-oriented electromagnetic steel sheet whose magnetic domains are controlled by laser beam irradiation according to claim 2, wherein a shape of the continuous-wave laser beam on a surface of the grain-oriented electromagnetic steel sheet is circular or elliptical.

4. The method for manufacturing a grain-oriented electromagnetic steel sheet whose magnetic domains are controlled by laser beam irradiation according to claim 3, wherein the direction of the scanning is substantially orthogonal to the rolling direction of the grain-oriented electromagnetic steel sheet.

5. The method for manufacturing a grain-oriented electromagnetic steel sheet whose magnetic domains are controlled by laser beam irradiation according to claim 2, wherein the direction of the scanning is substantially orthogonal to the rolling direction of the grain-oriented electromagnetic steel sheet.

6. The method for manufacturing a grain-oriented electromagnetic steel sheet whose magnetic domains are controlled by laser beam irradiation according to claim 1, wherein a shape of the continuous-wave laser beam on a surface of the grain-oriented electromagnetic steel sheet is circular or elliptical.

7. The method for manufacturing a grain-oriented electromagnetic steel sheet whose magnetic domains are controlled by laser beam irradiation according to claim 6, wherein the direction of the scanning is substantially orthogonal to the rolling direction of the grain-oriented electromagnetic steel sheet.

8. The method for manufacturing a grain-oriented electromagnetic steel sheet whose magnetic domains are controlled by laser beam irradiation according to claim 1, wherein the direction of the scanning is substantially orthogonal to the rolling direction of the grain-oriented electromagnetic steel sheet.

9. A method for manufacturing a grain-oriented electromagnetic steel sheet whose magnetic domains are controlled by laser beam irradiation, which reduces iron losses by scanning and irradiating a grain-oriented electromagnetic steel sheet with a continuous-wave laser beam condensed into a circular or elliptical shape at constant intervals in a direction substantially perpendicular to a rolling direction of the grain-oriented electromagnetic steel sheet, wherein when an average irradiation energy density Ua is defined as Ua=P/Vc/PL (mJ/mm$^2$), where P (W) is average power of the laser beam, Vc (mm/s) is a beam scanning velocity, and PL (mm) is an irradiation interval in a rolling direction, the following relationships are satisfied:

$$1.0\text{ mm} \leqq PL \leqq 3.0\text{ mm}$$

$$0.8\text{ mJ/mm}^2 \leqq Ua \leqq 2.0\text{ mJ/mm}^2.$$

10. The method for manufacturing a grain-oriented electromagnetic steel sheet whose magnetic domains are controlled by laser beam irradiation according to claim 9, wherein when an irradiation power density Ip is defined as Ip=(4/π)×P/(dL×dc) (kW/mm$^2$), where dc (mm) is a light condensing diameter in a beam scanning direction, and dL (mm) is a light condensing beam diameter in a direction orthogonal to the scanning direction, the following relationships are satisfied:

$$(88-15\times PL)\text{ kW/mm}^2 \geqq Ip \geqq (6.5-1.5\times PL)\text{ kW/mm}^2$$

$$1.0\text{ mm} \leqq PL \leqq 4.0\text{ mm}.$$

* * * * *